(12) United States Patent
Pisarsky

(10) Patent No.: US 7,694,190 B2
(45) Date of Patent: Apr. 6, 2010

(54) PREVENTING DISTRIBUTION OF MODIFIED OR CORRUPTED FILES

(75) Inventor: Vladimir Pisarsky, Sunnyvale, CA (US)

(73) Assignee: NXP B.V., Eindhoven (NL)

( * ) Notice: Subject to any disclaimer, the term of this patent is extended or adjusted under 35 U.S.C. 154(b) by 741 days.

(21) Appl. No.: 10/542,181

(22) PCT Filed: Jan. 15, 2004

(86) PCT No.: PCT/IB2004/000086

§ 371 (c)(1),
(2), (4) Date: Jul. 13, 2005

(87) PCT Pub. No.: WO2004/063911

PCT Pub. Date: Jul. 29, 2004

(65) Prior Publication Data

US 2006/0156066 A1    Jul. 13, 2006

Related U.S. Application Data

(60) Provisional application No. 60/440,447, filed on Jan. 16, 2003.

(51) Int. Cl.
G06F 11/00 (2006.01)
(52) U.S. Cl. .......................................................... 714/48
(58) Field of Classification Search .................. 714/52, 714/48
See application file for complete search history.

(56) References Cited

U.S. PATENT DOCUMENTS

| | | | | |
|---|---|---|---|---|
| 5,084,816 | A * | 1/1992 | Boese et al. | 714/4 |
| 5,519,830 | A * | 5/1996 | Opoczynski | 714/4 |
| 6,192,483 | B1 * | 2/2001 | Moiin et al. | 714/4 |
| 6,275,937 | B1 | 8/2001 | Hailpern et al. | |
| 6,694,469 | B1 * | 2/2004 | Jalali et al. | 714/748 |
| 6,697,963 | B1 * | 2/2004 | Nouri et al. | 714/31 |
| 6,778,970 | B2 * | 8/2004 | Au | 706/55 |
| 6,957,295 | B1 * | 10/2005 | Estakhri | 711/103 |
| 7,039,827 | B2 * | 5/2006 | Meyer et al. | 714/4 |

(Continued)

FOREIGN PATENT DOCUMENTS

WO    WO 00/28420    5/2000

OTHER PUBLICATIONS

J.O. Kephart, et al: "Blueprint for a Computer Immune System" Internet, Oct. 3, 1997, Retrieved From the Internet: URL http://www.reaserch.ib.com/antivirus/SciPapers/Kephart/VB97/.

*Primary Examiner*—Scott T Baderman
*Assistant Examiner*—Yair Leibovich

(57) ABSTRACT

An administrator node (130) adjusts a trustworthy-measure associated with nodes (110) that are suspected of unauthorized modifications of content material. The original provider of the content material to a network binds an identifying code to it. Upon receiving the material from a source node (110), a target node (120) computes an associated code for the received material. If the computed code and the identifying code differ, the material is determined to be modified, and a discrepancy report is submitted to the administrator node (130). The administrator node (130) effects a penalty against the root source if the modification is confirmed; or against the target node (120) if the discrepancy report is unfounded. The penalties include downgrading of the trustworthiness-measure associated with each node, and these trustworthiness-measures are available for use by potential target nodes in their selection of preferred source nodes.

20 Claims, 2 Drawing Sheets

U.S. PATENT DOCUMENTS

| | | | |
|---|---|---|---|
| 7,137,060 B2 * | 11/2006 | Yu et al. | 714/794 |
| 7,257,642 B1 * | 8/2007 | Bridger et al. | 709/238 |
| 2002/0010798 A1 * | 1/2002 | Ben-Shaul et al. | 709/247 |
| 2002/0059429 A1 * | 5/2002 | Carpenter et al. | 709/227 |
| 2002/0194319 A1 * | 12/2002 | Ritche | 709/223 |
| 2003/0007515 A1 * | 1/2003 | Apostolopoulos et al. | 370/503 |
| 2003/0061287 A1 * | 3/2003 | Yu et al. | 709/205 |
| 2003/0233594 A1 * | 12/2003 | Earl | 714/4 |
| 2004/0039968 A1 * | 2/2004 | Hatonen et al. | 714/39 |
| 2004/0054776 A1 * | 3/2004 | Klotz et al. | 709/224 |
| 2004/0073855 A1 * | 4/2004 | Maxwell | 714/724 |
| 2008/0141033 A1 * | 6/2008 | Ginter et al. | 713/175 |

* cited by examiner

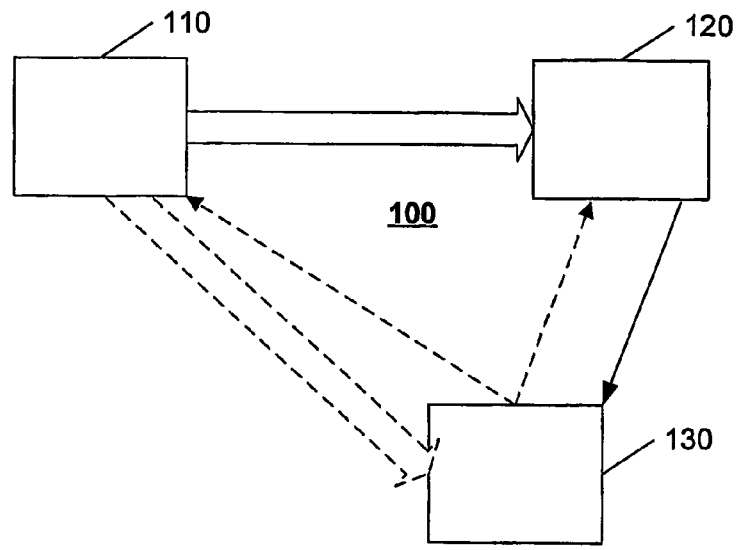
FIG. 1
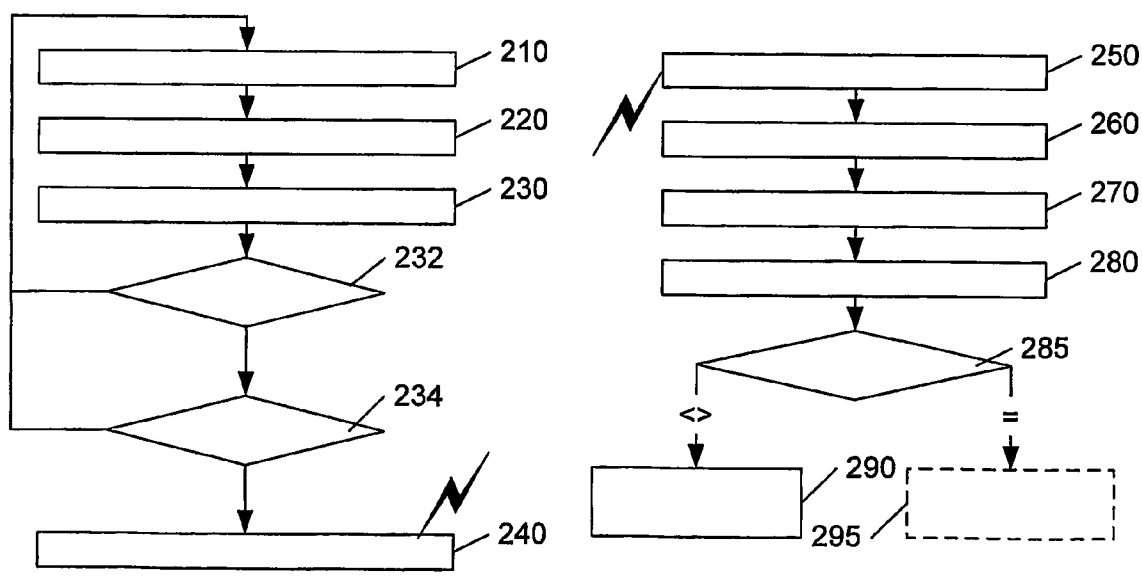
FIG. 2A  FIG. 2B

PREVENTING DISTRIBUTION OF MODIFIED OR CORRUPTED FILES

CROSS REFERENCE TO RELATED APPLICATION

This application claims the benefit of U.S. provisional application Ser. No. 60/440,447 filed 16 Jan. 2003, which is incorporated herein by reference.

This invention relates to the field of computer communications, and in particular to a method and system for controlling the distribution of modified or corrupted files via a distributed communications network.

In a distributed communications network, any node in the network may be a source of information content; as such, the integrity of the information content is questionable. A first user may, for example, download a song from a second user's system, and a third user may obtain a copy of the song from the first user; a fourth user may obtain a copy from the third user, and so on. If the first user's system has a virus that corrupts the contents of the file containing the song, the third, fourth, and subsequent users may receive a corrupted copy of the song, and may transfer this corrupted copy to yet other users. In like manner, the first user may have intentionally corrupted the song.

In a typical distributed network, a user identifies which files are available for distribution to other users. To facilitate the distribution of such files, an administrator node on the network typically provides and maintains a catalog of available files, and their location in the network. In a song-distribution network, for example, the catalog will generally contain the title of the song, the name of the artist, and the node from which this song can be downloaded. Often, copies of the same song will be available from a variety of nodes. Ideally, because the songs are digitally recorded, each copy of the same song is identical. However, if one of the copies is corrupted, or becomes corrupted, it may be distributed to many users before the problem is discovered, and some of these users may offer the as-yet-undiscovered corrupt file as a catalog entry. Thereafter, the integrity of any copy of the song from the catalog becomes questionable.

It is an object of this invention to provide a method and system for identifying modified or corrupted information content. It is another object of this invention to provide a method and system for identifying the source of the modification/corruption of the information content. It is another object of this invention to provide a method and system for resolving conflicts regarding whether the information content has been modified/corrupted, and if so, the source of this modification/corruption.

These objects, and others, are achieved by a method and system that includes a detection scheme and a reporting scheme. The original provider of content material to a network binds an identifying code to the material. When the material is received by a target node from a source node, the target node computes an associated code for this received material. If the computed code and the identifying code correspond, the material is determined to be as-provided by the original provider. If the computed code and the identifying code differ, the material is determined to be modified, and a discrepancy report is submitted to an administrator node. In like manner, if the content material is determined to be corrupted, or otherwise different than expected, a discrepancy report is submitted to the administrator node. The administrator node attempts to determine the root source of the modification or corruption, and effects a penalty against the root source if the modification or corruption is confirmed. Optionally, a penalty may be effected against the target node if the discrepancy report is unfounded. The penalties include downgrading of a trustworthiness-measure associated with each node in the network, and these trustworthiness-measures are available for use by potential target nodes in their selection of preferred source nodes.

FIG. 1 illustrates an example block diagram of a modification-monitoring system 100 in accordance with this invention.

FIGS. 2A-2B illustrate example flow diagrams of a modification-monitoring process in accordance with this invention.

Throughout the drawings, the same reference numeral refers to the same element, or an element that performs substantially the same function.

Figure 3:
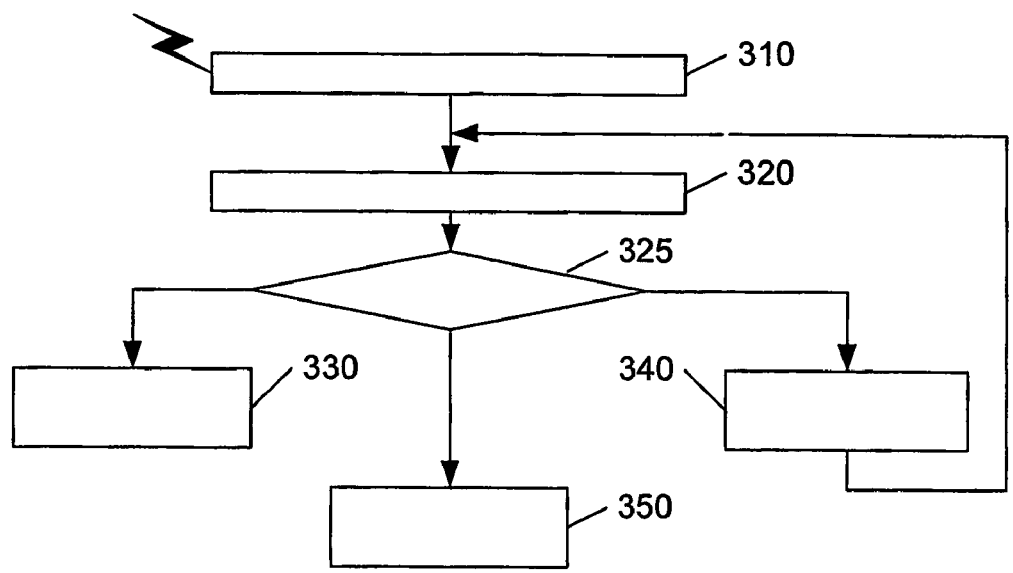
FIG. 3 illustrates an example flow diagram of a conflict-localization process in accordance with this invention.

This invention is based on the observation that the same information content may be available from a variety of sources within a network, or external to the network. By distinguishing nodes that are more likely to provide corrupted information content, other nodes on the network can be configured to avoid these nodes when seeking to download new information content, thereby reducing the proliferation of corrupted information content.

FIG. 1 illustrates an example block diagram of a modification-monitoring system 100 in accordance with this invention. A target node 120 initiates a transfer/download of an information file from a source node 110.

In accordance with this invention, each information file has an associated identifying code that is determined from the content of the information file. This identifying code may be, for example, a control-sum-code (CSC) that is based on a sum of the bytes within the information file, a hash value that is based on a transformation of the bytes within the file, or another parameter whose value is determined by the contents of the file. Preferably, a one-way code is used, such that the value of the code changes in an unpredictable manner when the contents of the file are modified.

The identifying code is associated with the information file when the information file is first introduced to the network. If a node in the network creates the information file, the node also creates the identifying code when the information file is created and/or made available to other nodes on the network. Alternatively, if a node in the network imports the information file from an external source, and the external source does not provide the identifying code, the receiving node creates the identifying code when the information file is received and made available to other nodes on the network. Note that, due to a variety of factors, such as sample rate differences, minor length differences, and so on, different recordings or different sources of the same song may have different identifying codes. Conversely, downloaded digital copies of the same song have identical identifying codes.

When the target node 120 receives the information file and its corresponding identifying code, the target node 120 independently computes a code for the received information file, using the same algorithm that was used to create the original identifying code. If the newly computed code corresponds to the received identifying code, the target node 120 concludes that the information file has not been modified. If, on the other hand, the newly computed code does not correspond to the received identifying code, the target node 120 concludes that the information file has been modified, either at the source node 110, or via the communication channel from the source 110 to the target 120. The target node 120 repeats the above process to distinguish whether the cause of the modification is the communication channel.

In accordance with this invention, when the target node 120 concludes that the communication channel is not the cause of the discrepancy between the newly computed code and the original identifying code, the target node 120 reports the discrepancy to an administrator node 130 for subsequent actions. The administrator node 130 determines the validity of the reported discrepancy, as detailed below, and penalizes the source node 110 if the source node 110 is deemed to be the cause of the modification to the information file.

Also in accordance with this invention, if the computed code matches the identifying code, but the target node 120 subsequently discovers a corruption of the information file, such as a song or video with excessive distortion, or a song or video that does not correspond to the title or author associated with the file, or other different-than-expected content, the target node 120 reports the discrepancy to the administrator node 130 for subsequent action, as detailed below.

Generally, the penalty imposed by the administrator node is a degradation of a trustworthy-measure associated with the source node 110. Thereafter, other nodes can access the trustworthy-measure associated with each of the nodes in the network to determine which nodes to use as a source for information files. In a preferred embodiment of this invention, the aforementioned catalog of available files includes this trustworthy-measure for each source, or a rating of each source based on its trustworthy-measure, such a red (danger), yellow (caution), or green (safe) shading of each source icon. Also in a preferred embodiment, the identifying code from the originating node is also included in the catalog, to facilitate identification of altered identifying codes.

Figure 4:
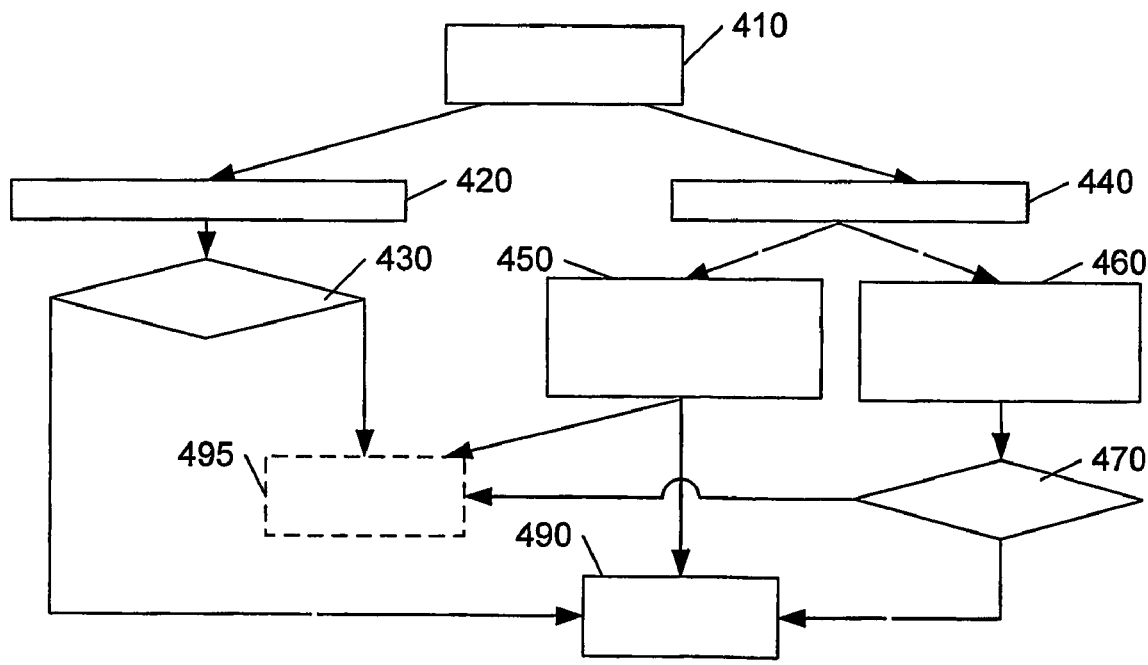
FIG. 4 illustrates an example flow diagram of a conflict-resolution process in accordance with this invention.

FIGS. 2A-2B illustrate example flow diagrams of a modification-monitoring process in accordance with this invention. FIG. 2A corresponds to the above detailed example process of a target node 120, and FIG. 2B corresponds to an example process of the administrator node 130. The example process of FIG. 2B illustrates a modification-detection scheme for determining the source of modified material, whereas the example processes of FIGS. 3 and 4 illustrate a conflict-resolution scheme for determining the original source of corrupt material.

At 210, in FIG. 2A, the target node requests content material from a source node, typically in the form of a computer file. The source node transmits the content material and its identifying code, which are received by the target, at 220. Alternatively, the identifying code may be obtained from the catalog, as discussed above. In this and the following examples, a control-sum-code (CSC) is used as the example identifying code. At 230, the target computes a corresponding code CSC', and compares it to the identifying code CSC that was received from the source node, or from the catalog, at 232. If these codes CSC, CSC' correspond, the process terminates, at 234. If the codes CSC, CSC' do not correspond, the above process is repeated, at 236, to verify that the difference was not caused by a communication error. When the target determines that the difference was not caused by a communication error, and therefore implies a distortion of the content at the source node, the target node transmits an error report to an administrator node.

At 250, in FIG. 2B, the administrator node receives the error report, which identifies the content file, the source, and the code CSC' computed by the reporting target node. The administrator requests the same content from the source, at 260, and receives the content from the source and the original identifying code CSC from either the source or the catalog, at 270. At 280, the administrator independently computes a corresponding verification code CSC" based on the received content, using the same algorithm that was used to create the original code CSC. If, at 285, the newly computed verification code CSC" does not correspond to the original code CSC, the administrator node penalizes the source node, at 290, typically by degrading the trustworthy-measure associated with the source node. Not shown in FIG. 2B, before penalizing the source node, the administrator node may repeat the download process to exclude communication errors, or it may compare its computed verification code CSC" with the computed code CSC' reported by the target node, to verify consistency.

Optionally, at 295, if the newly computed verification code CSC" corresponds to the original identifying code CSC from the source, the administrator node may penalize the reporting target node for filing a false report.

As noted above, a target node may also submit an error report when the target node subsequently discovers that the content of the file is different-than-expected, hereinafter termed "corrupted" content. As above, the error report includes an identification of the source node, an identification of the file, and optionally, the computed identifying code. Presumably, this computed code corresponds to the original identifying code, because otherwise a modification of the file would have been reported, as detailed above. That is, in accordance with this invention, if a node purposely modifies the content of a file, the node will be forced to generate a new identifying code that corresponds to the new/corrupted content, to avoid immediate detection by a target node using the above modification-detection scheme.

Upon receipt of this corruption-error report, the administrator node has two tasks: determining the root source of the reportedly-corrupted file, and determining whether the reportedly-corrupted file is, in fact, corrupt. As noted above, a corrupted file may be widely distributed before the corruption is identified, and, in a conventional system, identifying the source of corrupt content is extremely difficult. In accordance with the principles of this invention, however, the identifying code facilitates identifying the root source of corrupt content.

FIG. 3 illustrates an example flow diagram of a conflict-localization process in accordance with this invention. In FIG. 2B, it is assumed that the administrator merely had to decide whether the target's report was accurate. In reality, the source may have provided content that had been modified/corrupted previously, but not previously detected.

In a straight-forward embodiment of this invention, because each differing version of a copy of content material is identified by a different identifying code, the administrator node can find the source of the corrupted version by analyzing prior versions of the catalog, to determine the first supplier of this version of the content material, as identified by the identifying code. Often, however, the administrator node may not be the sole controller of items introduced onto the network, and/or, the administrator may not be configured to retain an exhaustive knowledge of the history of each published catalog, and/or, the administrator may not be configured to produce the catalog at all.

In accordance with a second aspect of the invention, the administrator node is configured to explicitly determine the source of a corrupted file, based on somewhat incomplete information. In accordance with this aspect of the invention, the administrator node notifies the source of the reported corruption, at 320, and awaits a response, at 325. If the source fails to respond within a given time interval, the administrator concludes that the corruption report is true, and penalizes the source. Not illustrated in FIG. 3, if a source admits to having supplied known-corrupt content material, the source is penalized, at 330.

If the source responds, the source will either concur or disagree with the report. Generally, when the source concurs with the report, the source also disclaims responsibility for the corruption, and identifies the prior source from which this source obtained the content material, at 340. In effect, the source provides a belated corruption report, identifying the prior source as the source of the corrupted file. The administrator repeats the notification process 320, using this prior source as the new current source. This back-tracking process 340-320 repeats, with each new source identifying its prior source, until the latest identified source fails to respond, and is penalized, at 330, or until the latest identified source disagrees with the reported corruption, at 325, and the administrator must resolve the conflict, at 350. Not illustrated, the administrator is also configured to provide conflict resolution at 350 when the administrator determines that the backtracking process 340-320 enters a continuous loop, wherein the true originator of the corruption falsely represents that a recipient of the corrupted material provided this material.

FIG. 4 illustrates an example flow diagram of a conflict-resolution process in accordance with this invention. At 410, the source may deny being the provider of the content material. In a preferred embodiment of this invention, the administrator has access to prior local regional content catalogs and tables, which identify files offered by each node over time, and the corresponding identifying code. At 420, the administrator checks these catalogs and tables to verify the source's claim of non-ownership. If, at 430, the source had owned the subject content material with the corresponding identifying code, then the source's denial is deemed false, and the source is penalized, at 490; otherwise, the node that reported this source node as the provider of the corrupt content material is optionally penalized, at 495.

Alternatively at 410, the source may dispute the assertion that the content material is corrupted, at which point the administrator effects a reliability check, at 440. The reliability check may address the reliability of the content material, or the reliability of the source node, or both. At 450, the administrator assesses the reliability of the content material. This can be performed by comparing the content material to other copies of the same content material, or, if available, to a known trusted copy of the content material. This assessment may be performed autonomously, if other copies of the content material can be located and a decision reached, or it may be performed with human intervention, wherein the administrator presents the evidence to a human arbitrator who decides whether the evidence is persuasive one way or the other. In the case of a corrupted song or video, for example, the arbitrator is provided the opportunity to hear/view the content.

In an alternative embodiment of this invention, the administrator may purposely distribute known-good content material to nodes of the network, as reliability-testing content. When the administrator receives a report of a distorted copy of this reliability-testing content material, the evidence against the node that first distributes the modified copy is fairly conclusive, justifying a somewhat severe penalty.

If the content material is found not to be distorted, the administrator optionally penalizes the node that reported the material as distorted, at 495; otherwise, if the content material is found to be distorted, the reported source is penalized, at 490.

At 460, the administrator assesses the reliabilities of the reporter and the source. Generally, this assessment is performed if the administrator is unable to ascertain whether a modification/corruption has actually been made to the original content material, and/or if the determination of the true root-source of the material is inconclusive. In a preferred embodiment of this invention, the administrator is configured to presume that the identified root source has modified the content material. Countering the assumption that the source is at fault, the administrator also considers other factors, such as the current trustworthy-measures of the source node and the reporting node, the length of time that each of the source and reporting nodes have been part of the network, the amount of traffic handled by each of the source and reporting nodes, and so on.

If the source node is determined to be inherently more reliable than the reporting node, the reporting node is optionally penalized, at 495; otherwise, the source node is penalized, at 490. Not illustrated, if the administrator is unable to conclusively assess the reliability of the content material or the source node, no penalty actions are taken for the current report.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

What is claimed is:

1. A method of affecting a trustworthy-measure associated with a source node in a distributed network, the method comprising:

receiving an information file from the source node and a corresponding identifying code that is based on content of the information file when the information file is introduced to the network, and computing an associated code based on received content of the information file;

comparing the associated code with the identifying code;

transmitting an error report to an administrator node, the error report identifying the source node and the information file, when at least one of the following occur: the associated code does not correspond to the identifying code, and the content of the information file is abnormal;

verifying the error report by the administrator node; and reducing the value of the trustworthy-measure associated with the source node in response to the administrator node verifying the error report, thereby providing the reduced-value trustworthy measure for evaluating subsequent use of the source node;

wherein transmitting an error report includes transmitting an error report in response to the step of comparing indicating that a difference between the associated code and the identifying code is not caused by a communication error, and further including: repeating the receiving, computing, and comparing steps prior to transmitting the error report.

2. The method of claim 1, wherein the identifying code includes at least one of: a control-sum-code, and a hash-value, and wherein verifying the error report by the administrator node includes receiving the information file from the source node by the administrator node, computing a verification code based on content of the information file received by the administrator node, comparing the verification code with the identifying code, and verifying the error report when the verification code does not correspond to the identifying code.

3. A method of facilitating control of distribution of modified or corrupted files in a distributed network, the method comprising:
   providing a catalog of available files to nodes of the distributed network, the catalog identifying each file of the available files and a corresponding source node of each file,
   processing an error report from a target node that received a downloaded file from a selected source node,
   verifying the error report,
   degrading a trustworthy-measure of at least one node of the distributed network based on a result of verifying the error report, and
   providing the trustworthy-measure of the at least one node to other nodes of the distributed network;
   wherein verifying the error report is based upon an identifying code corresponding to an original version of the downloaded file, and verifying the error report includes
   receiving the downloaded file from the selected source node by an administrator node,
   computing a verification code based on content of the downloaded file received by the administrator node,
   comparing the verification code with the identifying code, and
   verifying the error report when the verification code does not correspond to the identifying code.

4. The method of claim 3, wherein the catalog includes the identifying code.

5. A method of controlling a trustworthy-measure associated with a source node in a distributed network, the method comprising:
   receiving, from a reporting node, a report of a modification or corruption of an information file by the source node,
   determining a validity of the report, and
   degrading the trustworthy-measure associated with the source node when the report is determined to be valid;
   wherein
   determining the validity of the report includes notifying the source node of the report, and assessing a response from the source node to determine the validity of the report; and
   wherein
   receiving a report of a modification or corruption of an information file by the source node includes receiving a report that the modification or corruption was not caused by a communication error, and
   assessing the response includes: determining that the report is valid if the response is a null-response, or an admittance of effecting the modification or corruption of the information, and revising the report to identify an alternative source of the modification or corruption of the information, if the response includes an acknowledgement of the modification or corruption.

6. The method of claim 5, wherein assessing the response further includes assessing the reliability of at least one of: the information file, the source node, and the reporting node.

7. The method of claim 5, wherein determining the validity of the report further includes determining a reliability of the source node, and determining the reliability of the source node is based on at least one of the trustworthy-measure of the source node, longevity of the source node within the distributed network, traffic flow via the source node, and prior activities of the source node.

8. The method of claim 7, wherein determining the validity of the report also includes determining a reliability of the reporting node, and determining the reliability of the reporting node is based on at least one of: the trustworthy-measure of the reporting node, longevity of the reporting node within the distributed network, traffic flow via the reporting node, and prior activities of the reporting node.

9. The method of claim 5, wherein determining the validity of the report further includes a verification of prior ownership of the information file.

10. A communications network, comprising:
   a plurality of nodes, including at least a source node, a target node, and an administrator node, the source node having an information file and a corresponding identifying code based on content of the information file at a prior point in time,
   the target node being configured to: receive the information file and identifying code, transmit a discrepancy report based on at least one of: a discrepancy between the identifying code and a computed code based on received content of the information file, and an abnormality in the information file, and
   the administrator node being configured to: receive the discrepancy report, verify validity of the discrepancy report, and modify a trustworthy-measure associated with at least one node of the plurality of nodes in response to verifying the validity of the discrepancy report;
   wherein the administrator node is further configured to verify validity of the discrepancy report prior to modifying the trustworthy-measure by verifying that the discrepancy report is indicative of a modification or corruption of an information file by the source node that is not based upon a communication error.

11. The communications network of claim 10, wherein the administrator node is further configured to verify validity of the discrepancy report by: receiving the information file from the source node, and determining a verification code based on received content of the information file, and comparing the verification code to the identifying code.

12. The communications network of claim 10, wherein the administrator node is further configured to verify validity of the discrepancy report based on at least one of: a reliability of the received content of the information file, a record of prior ownership of the information file, a reliability of the source node, a reliability of the reporting node, a longevity of the source node within the network, a longevity of the reporting node within the network, prior activities of the source node within the network, and prior activities of the reporting node within the network.

13. The communications network of claim 12, wherein the trustworthy-measure of the source node is available for access by each of the plurality of nodes, to facilitate control of subsequent distribution of files from the source node based on the trustworthy-measure.

14. An administrator node in a distributed communications network for exchanging information files among a plurality of nodes, the administrator node configured to: receive a discrepancy report from a reporting node, the discrepancy report identifying a source node and an information file, verify the discrepancy report, and modify a trustworthy-measure associated at least one node of the plurality of nodes, based on whether the discrepancy report is valid: and wherein the discrepancy report is based on a comparison of a code computed by the reporting node to an identifying code corresponding to contents of the information file at a prior time to determine that the discrepancy report identifies a discrepancy that is not due to a communication error, the administrator node is configured to verify the discrepancy report by: receiving the information file from the source node, and determining a verification code based on received content of the information file, and comparing the verification code to the identifying code.

15. The administrator node of claim 14, wherein the administrator node is configured to verify the discrepancy report based on at least one of a reliability of the received content of the information file, a record of prior ownership of the information file, a reliability of the source node, a reliability of the reporting node, a longevity of the source node within the network, a longevity of the reporting node within the network, prior activities of the source node within the network, and prior activities of the reporting node within the network.

16. The administrator node of claim 14, wherein the administrator node is further configured to provide a catalog that identifies a plurality of information files and corresponding source nodes.

17. The administrator node of claim 16, wherein the catalog further includes a parameter based on the trustworthy-measure of the at least one node.

18. The method of claim 1, wherein repeating the receiving, computing, and comparing steps prior to transmitting the error report is used to determine whether information file errors were caused during or prior to communication of the information file from the source node.

19. The method of claim 18, further comprising preventing transmitting the error report upon determining that the information file errors were caused during communication.

20. A method of facilitating control of distribution of modified or corrupted files in a distributed network, the method comprising:

providing a catalog of available files to nodes of the distributed network, the catalog identifying each file of the available files and a corresponding source node of each file, processing an error report from a target node that received a downloaded file from a selected source node, verifying the error report, degrading a trustworthy-measure of at least one node of the distributed network based on a result of verifying the error report, and providing the trustworthy-measure of the at least one node to other nodes of the distributed network;

wherein verifying the error report includes determining an originator node responsible for modifications to the downloaded file giving rise to the error report, wherein determining the originator node includes notifying the selected source node, and assessing a response from the selected source node to determine the validity of the error report; and wherein assessing the response includes determining that the error report is valid if the response is a null-response or an admittance of causing the modifications to the downloaded file, and revising the report to identify an alternative source of the modifications to the downloaded file if the response includes an acknowledgement of the modifications.

* * * * *